April 14, 1959     R. A. ATTON     2,881,551
FISHING FLOAT
Filed Nov. 16, 1955
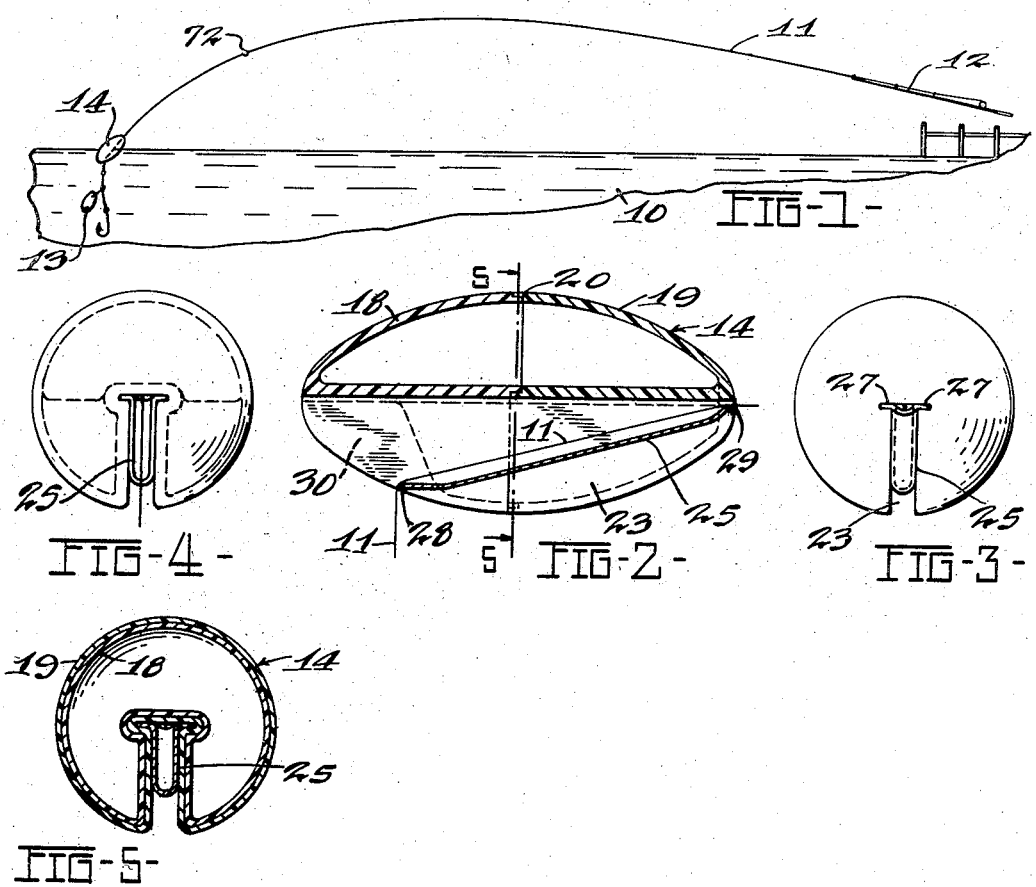
INVENTOR:
ROBERT A. ATTON.
BY
Harry O. Ernsberger
ATTORNEY

United States Patent Office 2,881,551
Patented Apr. 14, 1959

2,881,551

FISHING FLOAT

Robert A. Atton, Toledo, Ohio

Application November 16, 1955, Serial No. 547,159

3 Claims. (Cl. 43—44.9)

This invention relates to floats for fishing lines and more particularly to a float construction arranged for slidable movement along a fishing line whereby the float may be used for various kinds of angling.

The invention relates to a float especially adapted for relative slidable movement along a fishing line, the float being formed or provided with an opening or slot to receive and accommodate the line, the float being configurated to provide spaced bearing or engagement points for the line to reduce friction between the line and the float to a minimum.

An object of the invention resides in the provision of a float construction having a slot or opening therethrough to accommodate a fishing line, the float being weighted whereby it is normally buoyed in the water in an angular position to facilitate movement of the line through the float with a minimum of friction or drag of the line upon the float.

Another object of the invention resides in a float construction for angling purposes which is configurated in a manner whereby it may be readily made of thin sheet metal, moldable resins, wood, cork or other material which when fashioned into the desired configuration is sufficiently buoyant for the intended purposes.

An object of the invention is the provision of a float or bobber for angling purposes having a slot adapted to accommodate a fishing line whereby the float may be utilized where the lure is cast into the water or which may be used to advantage in still fishing.

Another object of the invention is the provision of a fishing float adapted to accommodate a fishing line whereby the angularity of the line with respect to the normal axis of the float is such as to provide a desirable angular position for the float riding upon the surface of the water facilitating the descending of the lure into the water in a manner whereby the line may be readily reeled in without interference of the float or obstruction to the passage of the fishing line therethrough.

Further objects and advantages are within the scope of this invention such as relate to the arrangement, operation and function of the related elements and to combinations of parts, elements per se, and to economies of manufacture and numerous other features as will be apparent from a consideration of the specification and drawing of a form of the invention, which may be preferred, in which:

Figure 1 is a semidiagrammatic view illustrating the position of the float of my invention assembled with a fishing line and showing the position of the float at the instant that it strikes the water during a lure casting operation;

Figure 2 is a longitudinal vertical sectional view through one form of float construction of my invention;

Figure 3 is a front end view of the float construction illustrated in Figure 2;

Figure 4 is a rear end view of the float construction shown in Figure 2; and

Figure 5 is a vertical transverse sectional view taken substantially on the line 5—5 of Figure 2.

Referring to the drawings in detail and first with respect to Figure 1, a body of water is illustrated at 10, a fishing line 11, a fishing rod 12, a fish lure 13 and a float 14, the construction of the latter forming the subject matter of the present invention. Figure 1 illustrates the approximate angular position occupied by the float 14 riding upon the surface of the body of water and illustrates the facility with which the lure may be lowered or elevated with the float occupying a most advantageous relative angular position in reeling in or paying out the fishing line.

Figures 2 through 5 inclusive illustrate one form of float construction of my invention, the arrangement including two hollow semiovoidal sections or elements 18 and 19, the walls of which preferably overlap as indicated at 20. This form of construction lends itself to fabrication from sheet metal or moldable plastic. If the sections are formed of sheet metal, the juncture 20 may be brazed or soldered to secure a sealed joint; and, if the sections 18 and 19 are formed of molded plastic or the like, the juncture at the overlapping portions may be sealed through the use of plastic cement or other suitable waterproof cementitious bonding material. The float 14 is of hollow configuration and has comparatively thin walls so as to provide a construction which is quite buoyant.

The float construction illustrated in Figures 2 through 5 is formed with a slot or opening 23 and approximately at the longitudinal axis of the float, an axial slot is formed lengthwise of the float to accommodate a U-shaped member 25 which may be formed of sheet metal or molded of plastic or fabricated of other suitable material. The U-shaped member 25 is formed with laterally extending flanges 27 which fit into the longitudinal slot or way formed in the float 14. The U-shaped member 25 is generally tapered toward the forward end of the float as illustrated in Figure 2, the extremities of the bight portion of the U-shaped member terminating in bearing points or surfaces 28 and 29 adapted for contact with the fishing line 11 in the manner shown in Figure 2. It will thus be apparent that the fishing line engages the float construction only at the points or restricted zones 28 and 29 which form guides to facilitate the slidable movement of the line 11 through the float.

It will be noticed from Figures 3 and 4 that the U-shaped member 25 presents an open throat adjacent the flanges 27 so that when the member 25 is slipped or moved in a lefthand direction as viewed in Figure 2 relative to the float sections 18 and 19, the flanges 27 move out of the slot formed in the sections so that the line 11 may be entered into the bight portion of the member 25 to the position shown in Figure 2. The U-shaped member 25 may then be slidably moved in a righthand direction as viewed in Figure 2 until the member is returned to the position shown. In this manner of assembly, the line 11 may be received in the slot 23 and within the bight portion of the U-shaped member 25 without threading the free end of the line through small openings as is conventional with most float constructions.

When it is desired to remove the float 14 from engagement with the fishing line 11, the user slides the member 25 in a lefthand direction as viewed in Figure 2 after which the line may be removed from the bight of the member 25 and completely disconnected from the float 14. To attain the most advantageous use of the float, it is preferable to equip the float with a weight eccentrically disposed with respect to a plane through the longitudinal axis to secure the desired angularity of positioning of the float upon the surface of the water. To accomplish this purpose, the rear walls or wall portions of the lower half of section 18 may be thickened as shown at 30 to increase the weight of the float at the rear portion thereof and beneath the longitudinal axis so as to cause the float to be tilted on the surface of the water as illustrated in Figure 1.

It is to be understood that the float construction illustrated in Figures 2 through 5 inclusive may be formed of wood or other materials which are normally buoyant in water as the U-shaped member 25 may be utilized with any type of material buoyant in water. While the member 25 may be made or molded of thin plastic, it has been found that sheet brass, copper or other material which is noncorrosive in water may be used to advantage in fabricating the member 25.

From the foregoing it will be apparent that I have provided a float construction which is of simple design but which is exceedingly effective both for casting operations and still fishing with a minimum drag on the line by reason of the spaced line engaging surfaces. This feature is of especial advantage when the line is wetted as such condition increases the friction between a line and the float. For still fishing a knot may be tied in the line 11 to limit the extent of movement of the line through the float, or a metal pellet 72 shown in Figure 1 having a kerf to receive the line may be used for the purpose.

It is apparent that, within the scope of the invention modifications and different arrangements may be made other than is herein disclosed, and the present disclosure is illustrative merely, the invention comprehending all variations thereof.

What I claim is:

1. A float construction for use with a fishing line including, in combination, a substantially ovoidal shaped member having a slot formed lengthwise therein; an element of substantially U-shape in cross section slidably received in said slot; said element being formed with a pair of spaced line engaging surfaces, and means for establishing a center of buoyancy of the member spaced from the geometric center thereof.

2. A float construction for use with a fishing line including, in combination, a substantially ovoidal shaped member having a U-shaped slot formed lengthwise therein; an element of substantially U-shaped in cross section slidably received in said slot; said element being formed with a pair of spaced raised portions forming line engaging points, and means for establishing a center of buoyancy of the member spaced from the geometric center thereof.

3. A float construction for use with a fishing line including an elongated member configured so as to float upon a body of water; a second member slidably connected with said first mentioned member; said second member having a recess adapted to receive a fishing line, said second member being formed with spaced line engaging surfaces for reducing the friction between the line and the second member during relative movement thereof; said recess having an open throat to receive the line when said members are disconnected.

References Cited in the file of this patent

UNITED STATES PATENTS

| | | |
|---|---|---|
| 2,241,851 | Gilstrap | May 13, 1941 |
| 2,527,956 | Peevey | Oct. 31, 1950 |
| 2,582,619 | Blockinger | Jan. 15, 1952 |
| 2,693,049 | Atton | Nov. 2, 1954 |

FOREIGN PATENTS

| | | |
|---|---|---|
| 465,761 | Canada | June 13, 1950 |